United States Patent
Eilam

(10) Patent No.: US 9,323,777 B1
(45) Date of Patent: Apr. 26, 2016

(54) DISTRIBUTED FILE-SHARING ACROSS PERSONAL DEVICES

(71) Applicant: hopTo Inc., Campbell, CA (US)

(72) Inventor: Eldad Eilam, San Jose, CA (US)

(73) Assignee: HOPTO INC., Campbell, CA (US)

(*) Notice: Subject to any disclaimer, the term of this patent is extended or adjusted under 35 U.S.C. 154(b) by 0 days.

(21) Appl. No.: 13/668,088

(22) Filed: Nov. 2, 2012

(51) Int. Cl.
| G06F 7/00 | (2006.01) |
| G06F 17/30 | (2006.01) |
| G06F 11/14 | (2006.01) |
| G06F 17/00 | (2006.01) |

(52) U.S. Cl.
CPC ...... G06F 17/30206 (2013.01); G06F 11/1448 (2013.01); G06F 11/1469 (2013.01); G06F 17/30575 (2013.01); G06F 17/30584 (2013.01)

(58) Field of Classification Search
CPC .............. G06F 17/30575; G06F 17/30584; G06F 17/30206; G06F 11/1448; G06F 11/1469
USPC ......................................................... 707/827
See application file for complete search history.

(56) References Cited

U.S. PATENT DOCUMENTS

| 6,003,045 A * | 12/1999 | Freitas et al. ........... 707/999.001 |
| 6,279,030 B1 * | 8/2001 | Britton et al. ................. 709/203 |
| 2005/0108430 A1 * | 5/2005 | Howarth et al. .............. 709/245 |
| 2006/0008256 A1 * | 1/2006 | Khedouri et al. ............. 386/124 |
| 2007/0157281 A1 * | 7/2007 | Ellis et al. ...................... 725/134 |
| 2008/0034394 A1 * | 2/2008 | Jacobs et al. .................... 725/98 |
| 2008/0052641 A1 * | 2/2008 | Brown et al. ................. 715/811 |
| 2008/0133706 A1 * | 6/2008 | Chavez et al. ................ 709/218 |
| 2008/0243924 A1 * | 10/2008 | Barrett et al. .............. 707/104.1 |

\* cited by examiner

*Primary Examiner* — Kannan Shanmugasundaram
(74) *Attorney, Agent, or Firm* — Polsinelli LLP

(57) ABSTRACT

Systems and methods for distributed file-sharing across personal devices are provided. Information is maintained in memory regarding multiple user devices associated with an authenticated user. The stored information may concern one or more files stored on each of the user devices. A request is received from a first user device associated with the authenticated user concerning access to a file. One or more of the other user devices may store a copy of the file. The user devices that store a copy of the requested file may be identified. A request is sent to the identified user devices, which may then provide one or more portions of the requested file to the requesting user device, which may then assemble the portions into a whole copy of the file.

19 Claims, 2 Drawing Sheets

DISTRIBUTED FILE-SHARING ACROSS PERSONAL DEVICES

BACKGROUND

1. Field of the Invention

The present invention generally relates to file-sharing. More specifically, the present invention relates to distributed file-sharing across personal devices.

2. Description of the Related Art

Individuals currently have a variety of computing options available to them. Such options may include traditional desktop computing devices, as well as various mobile devices (e.g., mobile phones, smartphones, tablets). In fact, many individuals may use multiple computing and mobile devices at home, work, and on the move. For example, an individual may use a desktop computer at work, a laptop computer at home, and one or more mobile devices (e.g., smartphone, tablet) elsewhere.

One difficulty with having access to multiple devices is that each device may store different information. For example, an individual may store personal information and files on a home computer, store professional information on a work office computer, and a combination on a mobile computing device. Occasionally, an individual may need to located at a remote location from the user device upon which a desired file is stored. For example, an individual may be traveling, but need access to a file on a home computer.

One current solution to such a problem relies on storing information in the cloud. A variety of cloud-based storage services may be available (e.g., Dropbox®, Box®), which allows for online storage and access to files. As a result, any device with an internet connection may be able to access such stored files. There may be a variety of complications with such a solution. One is that the files are stored under the control of an entity that is not the user. While various security measures may be implemented, concerns about privacy and security remain. Moreover, for security and other reasons, the entity providing storage services may not be completely transparent as to what security measures are being deployed. A user who is concerned with privacy and security may wish to be able to have complete control over how his or her data is stored. Having such control additionally allows the user to be more immediately aware of any breaches or seizure attempts that may occur.

There is, therefore, a need in the art for improved systems and methods for distributed file-sharing across personal devices.

SUMMARY OF THE CLAIMED INVENTION

Embodiments of the present invention provide systems and methods for a distributed file-sharing across personal devices. Information is maintained in memory regarding multiple user devices associated with an authenticated user. The stored information may concern one or more files stored on each of the user devices. A request is received from a first user device associated with the authenticated user concerning access to a file. One or more of the other user devices may store a copy of the file. The user devices that store a copy of the requested file may be identified. A request is sent to the identified user devices, which may then provide one or more portions of the requested file to the requesting user device, which may then assemble the portions into a whole copy of the file.

Various embodiments of the present invention include methods for distributed file-sharing across personal devices. Such methods may include maintaining information in memory regarding multiple user devices associated with an authenticated user. Such information may concern one or more files stored on each of the user devices. Methods may additionally include receiving a request from the authenticated user using one of the user devices concerning access to a file, identifying one or more other user devices storing the copy of the requested file, and transmitting the request over a communication network to the identified user devices. In response to the request, the identified user devices may provide one or more portions of the requested file to the requesting user device, which may then assembles the portions into a whole copy of the file.

Embodiments of the present invention may further include systems for distributed file-sharing across personal devices. Such systems may include memory for maintaining information in memory regarding multiple user devices associated with an authenticated user. Such information may concern one or more files stored on each of the user devices. Systems may additionally include a communications interface for receiving a request from the authenticated user using one of the user devices concerning access to a file and a processor for executing instructions to identify one or more other user devices storing the copy of the requested file. The communications interface may also be used to transmit the request over a communication network to the identified user devices. In response to the request, the identified user devices may provide one or more portions of the requested file to the requesting user device, which may then assembles the portions into a whole copy of the file.

Other embodiments of the present invention include non-transitory computer-readable storage media on which is embodied instructions executable to perform a method for distributed file-sharing across personal devices, as previously set forth above.

DETAILED DESCRIPTION

Embodiments of the present invention provide systems and methods for distributed file-sharing across personal devices. Information is maintained in memory regarding multiple user devices associated with an authenticated user. The stored information may concern one or more files stored on each of the user devices. A request is received from a first user device associated with the authenticated user concerning access to a file. One or more of the other user devices may store a copy of the file. The user devices that store a copy of the requested file may be identified. A request is sent to the identified user devices, which may then provide one or more portions of the requested file to the requesting user device, which may then assemble the portions into a whole copy of the file.

Figure 1:
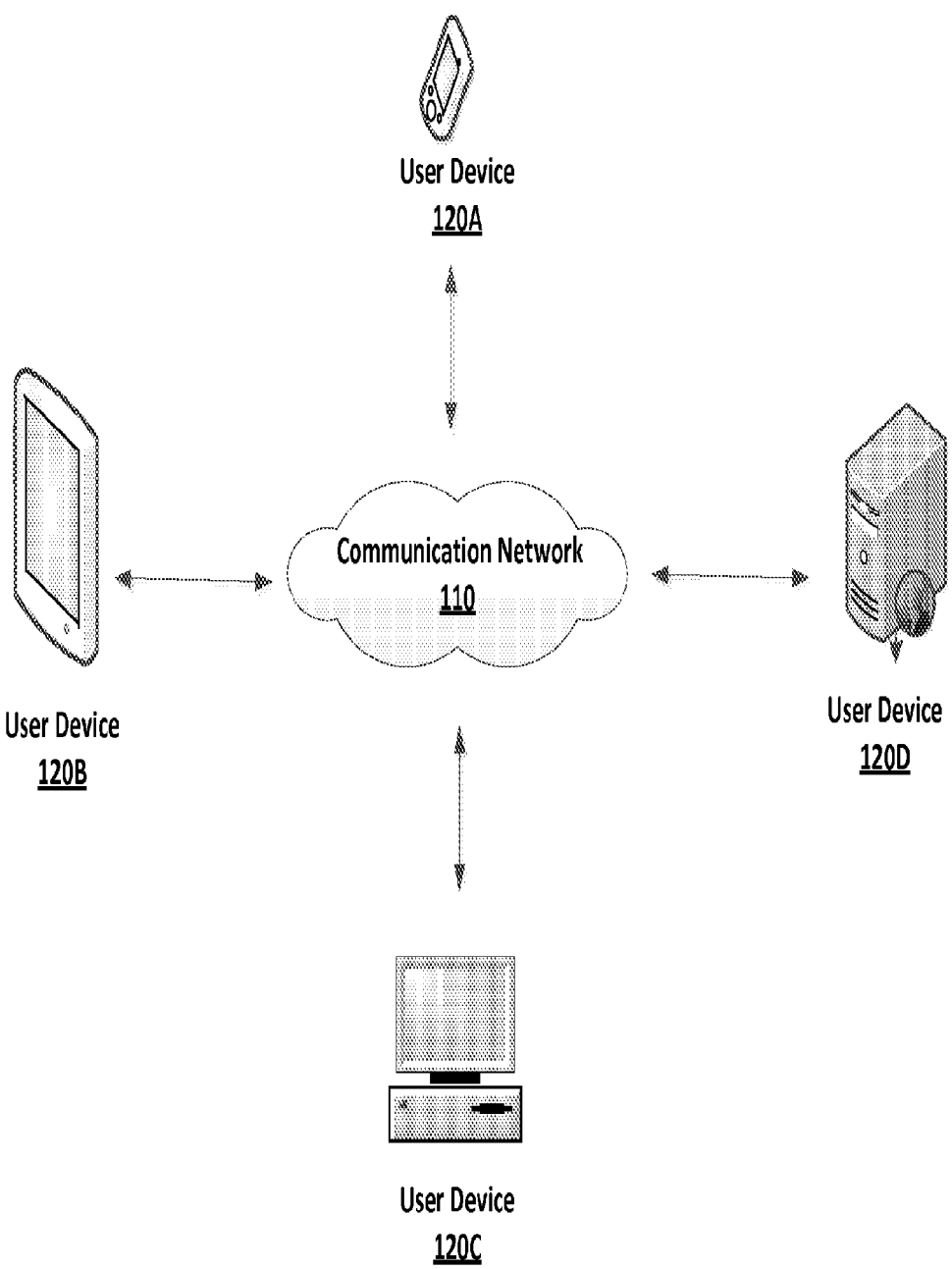
FIG. 1 illustrates a network environment in which an exemplary system for distributed file-sharing across personal devices may be implemented.

FIG. 1 illustrates a network environment 100 in which a system for a distributed file-sharing across personal devices may be implemented. Network environment 100 may include a communication network 110 and one or more user devices 120A-D. Devices 120A-D in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic user devices 120A-D, such as general purpose computers, mobile phones, smartphones, personal digital assistants (PDAs), portable computing devices (e.g., laptop, netbook, tablets), desktop computing devices, handheld computing device, servers, or any other type of computing device capable of communicating over communication network 110. User devices 120 may also be configured to access data from other storage media, such as memory cards or disk drives as may be appropriate in the case of downloaded services. User device 120 may include standard hardware computing components such as network and media interfaces, non-transitory computer-readable storage media (e.g., memory), and processors for executing instructions that may be stored in memory.

Each user device 120 may act as a host device for storing information; likewise, each user device 120 may act as the client device in communication with and requesting information stored on a host. A user device 120 may further include a client application, a client 3D library, and a client display driver. Collectively, these elements may enable the user device and the user to consume computer graphics resources or services provided by server 110.

Figure 2:
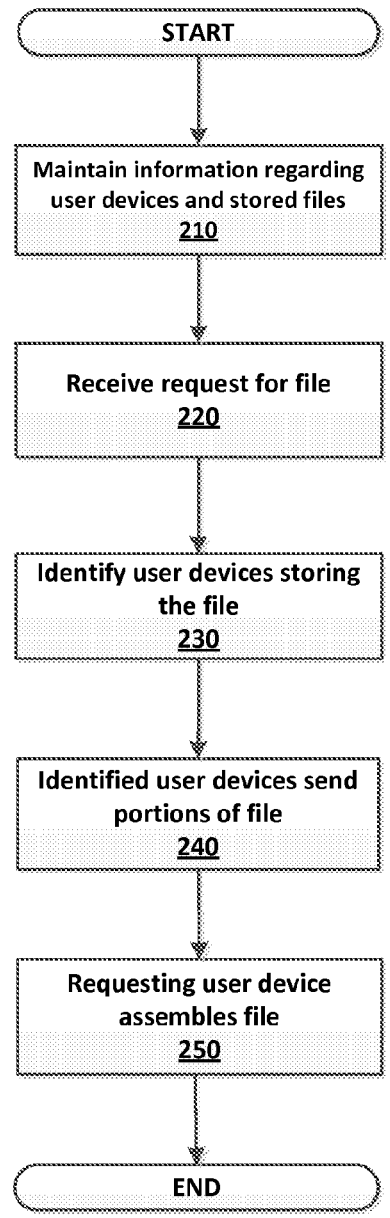
FIG. 2 is a flowchart illustrating an exemplary method for distributed file-sharing across personal devices.

FIG. 2 illustrates a method 200 for distributed file-sharing across personal devices. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, information regarding stored files is stored in memory regarding each of a plurality of user devices associated with an authenticated user, a request is received from the authenticated user concerning access to a file stored on one or more of the user devices, instructions stored in memory are executed to identify the user devices upon which the requested file is stored, the request is transmitted over a communication network to the identified user devices, each of which may then provide one or more portions of the stored file in response to the request, and the requesting user device assembles portions received from the user devices to form a whole copy of the requested file.

In step 210, information is stored in memory of a user device (e.g., user device 120A) regarding a plurality of user devices (e.g., user devices 120A-D). Each of the user devices may be associated with an authenticated user. The user may be authenticated in a variety of ways, including passwords, passcodes, keys, and other methods known in the art for authenticating a user. The stored information regarding the user devices may have been entered by the user, provided by the other user devices, or a combination of the foregoing. The information regarding the user devices 120 may include associated phone numbers, media access control (MAC) addresses, internet protocol (IP) addresses, and other identifying information. In addition, the stored information may further include a list of files stored on each of the user devices 120. As such, user device 120A has information not only on the files stored locally on the user device 120A, but also on file stored remotely on any of the other user devices 120B-D. The information regarding the file may include title, file type, content, content type, and other metadata known in the art. In some embodiments, metadata may include information regarding a plurality of portions of the file and an order to those portions. Such metadata may be used, for example, to determine whether a user device 120A possesses all portions of the file and further, how to assemble those portions into a whole file. In this regard, such metadata may be similar to a torrent file, which holds information regarding defined chunks of a file.

In step 220, an authenticated user using a user device (e.g., user device 120A) submits a request for a particular file stored on one or more of the other user devices 120B-D. Some embodiments of the present invention may allow for the authenticated user to browse a directory or menu of files stored among the multiple user devices or otherwise search for a particular file. In some instances, the user may be able to create bookmarks or links to a certain file that allow for convenient requests.

In step 230, the requested file is determined to be located on one or more other user devices (e.g., user devices 120B-C). The determination that the requested file is not stored locally, but on another user device, may be based on the information stored in memory in step 210. In addition, the stored information may identify the particular user devices 120B-C, each of which is currently storing a copy of the requested file. The requested file (or user devices 120B-C storing the requested file) may be located based on, for example, identifying information stored in memory with respect to the requested file (e.g., file name, file metadata, magnet uniform resource identifier (URI)) or user devices 120B-C (e.g., phone number, MAC address, IP address). Once file (or the user devices 120B-C that are storing the requested file) is identified and located, a request for the file may be sent from user device 120A to user devices 120B-C.

In step 240, the requested file may be provided in portions to the requesting user device (e.g., user device 120A) from the identified user devices (e.g., user devices 120B-C) storing a copy of the requested file. As such, the requesting user device 120A may be downloading different portions simultaneously from any number of sources (e.g., user devices 120B-C) of the requested file. The requested file may therefore be divided into defined portions, and those portions are sent to the requesting user device 120A. The requesting user device 120A may evaluate metadata to determine whether all portions of the requested file have been received. For example, the metadata may indicate that the requested file had been divided into 200 portions, and that user device 120A has received 195 portions. Moreover, the metadata may also be used to identify which portions are still missing (e.g., portions #2, 10, 50, 160, and 198 from portions numbered #1-200).

In step 250, the requesting user device 120A assembles the received portions into a whole copy of the requested file. Metadata associated with the requested file may indicate how the received portions should be ordered and assembled together. In some instances, additional verification, security, or authentication measure may be deployed prior to granting access, including passwords, passcodes, keys, and similar measures known in the art.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for distributed file-sharing across personal devices, the method comprising:
    maintaining information in memory regarding a plurality of personal user devices under control of an authenticated user, wherein the user has previously been authenticated on each of the plurality of personal user devices, wherein the maintained information is regarding identifying information for each personal user device under control of the authenticated user and what files are stored on each of the personal user devices under control of the authenticated user, and wherein the maintained information is inputted by the user and provided by the other personal user devices upon request;
    receiving a request from the authenticated user using one of the personal user devices under control of the authenticated user, wherein the received request via, the requesting user device, pertains to a requested file stored on one or more of the plurality of personal user devices under control of the authenticated user;
    determining that the received request concerns access to one or more portions of the requested file that is available on the plurality of personal user devices under control of the authenticated user, wherein the one or more portions of the requested file determined to be available locally on the requesting user device is retrieved from local storage associated with the requesting user device;
    determining that the received request concerns access to one or more portions of the requested file that is unavailable on the requesting user device;
    executing instructions stored in memory, wherein execution of the instructions by a processor identifies the one or more other personal user devices under control of the authenticated user that stores the copy of the one or more portions of the requested file from memory;
    transmitting the request over a communication network to the identified other personal user devices under control of the authenticated user, wherein each identified other personal user device under control of the authenticated user provides the one or more portions of the stored copy of the requested file to the requesting user device in response to the request; and
    receiving assembly instructions indicating how to assemble the one or more portions transmitted from the identified other user devices under control of the authenticated user into an order to generate a whole copy of the requested file, wherein the requesting user device assembles the portions received from the personal user devices in accordance with the received assembly instructions to generate the whole copy of the requested file.

2. The method of claim 1, wherein the received instructions are provided as metadata.

3. The method of claim 2, wherein the metadata includes torrent information regarding how the portions of the requested file are defined.

4. The method of claim 1, further comprising using the instructions to determine when all portions of the requested file have been received.

5. The method of claim 1, further comprising using the instructions to determine which portions of the requested file have been received and which portions of the requested file have not been received.

6. The method of claim 1, further comprising generating a directory of files stored on one or more of the user devices associated with the user.

7. The method of claim 6, wherein the requested file is selected by the user from the generated directory.

8. The method of claim 7, wherein the directory includes at least one bookmark to the requested file, wherein the user previously designated that the requested file be bookmarked.

9. The method of claim 1, further comprising automatically defining the portions of the requested file and sending instructions to the other user devices regarding defined portions of the requested file.

10. A system for distributed file-sharing across personal devices, the system comprising:
    a plurality of personal user devices under control of an authenticated user, wherein the user has previously been authenticated on each of the plurality of personal user devices, each user device under control of the authenticated user comprising:
        memory for maintaining information regarding the plurality of other personal user devices under control of the authenticated user, wherein the maintained information is regarding identifying information for each personal user device under control of the authenticated user and what files are stored on each of the personal user devices under control of the authenticated user, and wherein the maintained information is inputted by the user and provided by the other personal user devices upon request, a user interface for receiving a request from the authenticated user using one of the personal user devices under control of the authenticated user, wherein the received request pertains to a requested file stored on one or more of the plurality of personal user devices under control of the authenticated user, a processor for executing instructions stored in memory, wherein execution of the instructions by the processor:

determines that the received request concerns access to one or more portions of the requested file that is available on the plurality of personal user devices under control of the authenticated user, wherein a one or more portions of the requested file determined to be available locally on the requesting user device is retrieved from local storage associated with the requesting user device, determines that the received request concerns access to one or more portions of the requested file that is unavailable on the requesting user device;

identifies the one or more other personal user devices under control of the authenticated user that stores the copy of the one or more portions of the requested file from memory, a communication interface for:

transmitting the request over a communication network to the identified other personal user devices under control of the authenticated user, wherein each identified other personal user device under control of the authenticated user provides one or more portions of the stored copy of the requested file in response to the request, and receiving assembly instructions indicating how to assemble the one or more portions transmitted from the identified other user devices under control of the authenticated user into an order to generate a whole copy of the requested file, wherein the requesting user device assembles the portions received from the personal user devices in accordance with the received assembly instructions to generate the whole copy of the requested file.

11. The system of claim 10, wherein the received instructions are provided as metadata.

12. The system of claim 11, wherein the metadata includes torrent information regarding how the portions of the requested file are defined.

13. The system of claim 10, wherein further execution of the received instructions determines when all portions of the requested file have been received.

14. The system of claim 10, wherein further execution of the received instructions determines which portions of the requested file have been received and which portions of the requested file have not been received.

15. The system of claim 10, wherein further execution of the instructions in memory generates a directory of files stored on one or more of the user devices associated with the user.

16. The system of claim 15, wherein the requested file is selected by the user from the generated directory.

17. The system of claim 16, wherein the directory includes at least one bookmark to the requested file, wherein the user previously designated that the requested file be bookmarked.

18. The system of claim 10, wherein further execution of the instructions in memory automatically defines the portions of the requested file and sending instructions to the other user devices regarding defined portions of the requested file.

19. A non-transitory computer-readable storage medium, having embodied thereon a program executable by a processor to perform a method for distributed file-sharing across personal devices, the method comprising:

maintaining information regarding a plurality of personal user devices under control of an authenticated user, wherein the user has previously been authenticated on each of the plurality of personal user devices, wherein the maintained information is regarding identifying information for each personal user device under control of the authenticated user and what files are stored on each of the personal user devices under control of the authenticated user, and wherein the maintained information is inputted by the user and provided by the other personal user devices upon request;

receiving a request from the authenticated user using one of the personal user devices under control of the authenticated user, wherein the received request via, the requesting user device, pertains to a requested file stored on one or more of the plurality of personal user devices under control of the authenticated user;

determining that the received request concerns access to one or more portions of the requested file that is available on the plurality of personal user devices under control of the authenticated user, wherein the one or more portions of the requested file determined to be available locally on the requesting user device is retrieved from local storage associated with the requesting user device;

determining that the received request concerns access to one or more portions of the requested file that is unavailable on the requesting user device;

identifying the one or more other personal user devices under control of the authenticated user that stores the copy of the one or more portions of the requested file from memory;

transmitting the request over a communication network to the identified other personal user devices under control of the authenticated user, wherein each identified other personal user device under control of the authenticated user provides the one or more portions of the stored copy of the requested file to the requesting user device in response to the request; and receiving assembly instructions indicating how to assemble the one or more portions transmitted from the identified other user devices under control of the authenticated user into an order to generate a whole copy of the requested file, wherein the requesting user device assembles the portions received from the personal user devices in accordance with the received assembly instructions to generate the whole copy of the requested file.

* * * * *